(12) United States Patent
Bubb et al.

(10) Patent No.: US 11,459,924 B2
(45) Date of Patent: Oct. 4, 2022

(54) HONEYCOMB BODY HAVING LAYERED PLUGS AND METHOD OF MAKING THE SAME

(71) Applicant: Corning Incorporated, Corning, NY (US)

(72) Inventors: Keith Norman Bubb, Beaver Dams, NY (US); Thomas Richard Chapman, Painted Post, NY (US); Kenneth Joseph Drury, Big Flats, NY (US); Todd Parrish St Clair, Painted Post, NY (US); Courtney Spencer Warren, Waverly, NY (US)

(73) Assignee: Corning Incorporated, Corning, NY (US)

( * ) Notice: Subject to any disclaimer, the term of this patent is extended or adjusted under 35 U.S.C. 154(b) by 1186 days.

(21) Appl. No.: 15/508,791

(22) PCT Filed: Sep. 2, 2015

(86) PCT No.: PCT/US2015/048009
§ 371 (c)(1),
(2) Date: Mar. 3, 2017

(87) PCT Pub. No.: WO2016/036779
PCT Pub. Date: Mar. 10, 2016

(65) Prior Publication Data
US 2017/0276042 A1  Sep. 28, 2017

Related U.S. Application Data

(60) Provisional application No. 62/045,233, filed on Sep. 3, 2014.

(51) Int. Cl.
*F01N 3/022*     (2006.01)
*C04B 38/00*     (2006.01)
(Continued)

(52) U.S. Cl.
CPC ....... *F01N 3/0222* (2013.01); *B01D 46/2429* (2013.01); *B01D 46/2459* (2013.01);
(Continued)

(58) Field of Classification Search
CPC .... F01N 3/0222; F01N 3/035; F01N 2330/06; C04B 38/0012; C04B 38/0006;
(Continued)

(56) References Cited

U.S. PATENT DOCUMENTS 4,557,773 A   12/1985  Bonzo
5,258,150 A   11/1993  Merkel et al.
(Continued)

FOREIGN PATENT DOCUMENTS

CN    1475660 A    2/2004
CN    101687719 A   3/2010
(Continued)

OTHER PUBLICATIONS

Machine translation of JP2010221189 (Year: 2010).*
(Continued)

*Primary Examiner* — Colin W. Slifka
(74) *Attorney, Agent, or Firm* — Joseph M. Homa

(57) ABSTRACT

A porous ceramic honeycomb body (10) including intersecting walls that form channels (22) extending axially from a first end face to a second end face and layered plugs (62) comprised of a first layer (64) disposed on channel walls and a second layer (66) disposed inward toward an axial center of each respective channel on the first layer. The plugs seal at least one of a first portion of the channels at the first end face and a second portion of channels at the second end face of the porous ceramic honeycomb body.

22 Claims, 12 Drawing Sheets

(51) Int. Cl.
  *C04B 28/24*    (2006.01)
  *B01D 46/24*    (2006.01)
  *C04B 35/636*   (2006.01)
  *B28B 11/00*    (2006.01)
  *C04B 35/195*   (2006.01)
  *B01D 53/94*    (2006.01)
  *B01J 35/04*    (2006.01)
  *F01N 3/035*    (2006.01)
  *C04B 111/00*   (2006.01)

(52) U.S. Cl.
  CPC ..... *B01D 46/2474* (2013.01); *B01D 53/9418* (2013.01); *B01J 35/04* (2013.01); *B28B 11/007* (2013.01); *C04B 28/24* (2013.01); *C04B 35/195* (2013.01); *C04B 35/6365* (2013.01); *C04B 38/0006* (2013.01); *C04B 38/0012* (2013.01); *F01N 3/035* (2013.01); *B01D 2255/50* (2013.01); *B01D 2255/9155* (2013.01); *B01D 2279/30* (2013.01); *C04B 2111/0081* (2013.01); *C04B 2111/00793* (2013.01); *C04B 2235/3234* (2013.01); *C04B 2235/3236* (2013.01); *C04B 2235/3418* (2013.01); *C04B 2235/3463* (2013.01); *C04B 2235/3472* (2013.01); *C04B 2235/3481* (2013.01); *C04B 2235/3826* (2013.01); *C04B 2235/3873* (2013.01); *F01N 2330/06* (2013.01); *Y02T 10/12* (2013.01)

(58) Field of Classification Search
  CPC ... C04B 28/24; C04B 35/6365; C04B 35/195; C04B 2111/00793; C04B 2235/3481; C04B 2235/3236; C04B 2235/3418; C04B 2235/3472; C04B 2111/0081; C04B 2235/3826; C04B 2235/3234; C04B 2235/3463; C04B 2235/3873; B01D 46/2429; B01D 46/2459; B01D 46/2474; B01D 53/9418; B01D 2255/50; B01D 2255/9155; B01D 2279/30; B01D 46/244; B28B 11/007; B01J 35/04; Y02T 10/12
  USPC ....................................................... 502/232
  See application file for complete search history.

(56) References Cited

U.S. PATENT DOCUMENTS

| | | | |
|---|---|---|---|
| 5,891,820 | A | 4/1999 | King |
| 6,673,300 | B2 | 1/2004 | Allen et al. |
| 6,840,976 | B2 | 1/2005 | Vance et al. |
| 7,090,714 | B2 | 8/2006 | Otsubo et al. |
| 7,297,175 | B2 | 11/2007 | Miwa |
| 7,429,285 | B2 | 9/2008 | Kuki et al. |
| 7,618,596 | B2 | 11/2009 | Ichikawa et al. |
| 7,687,008 | B2 | 3/2010 | Okazaki et al. |
| 7,691,167 | B2 | 4/2010 | Tokumaru |
| 7,744,669 | B2 | 6/2010 | Paisley et al. |
| 7,922,951 | B2 | 4/2011 | Mudd et al. |
| 8,080,208 | B2 | 12/2011 | Kim |
| 8,092,568 | B2 | 1/2012 | Konomi et al. |
| 8,182,603 | B2 | 5/2012 | Cecce et al. |
| 8,398,797 | B2 | 3/2013 | Okazaki |
| 8,435,320 | B2 | 5/2013 | Ishizawa et al. |
| 8,435,441 | B2 | 5/2013 | Bookbinder et al. |
| 8,460,589 | B2 | 6/2013 | Tokumaru |
| 8,591,820 | B2 | 11/2013 | Boger et al. |
| 2005/0129907 | A1* | 6/2005 | Yamaguchi ......... C04B 38/0012 428/116 |
| 2006/0131782 | A1 | 6/2006 | Mudd et al. |
| 2006/0153748 | A1 | 7/2006 | Huthwohl et al. |
| 2007/0104622 | A1* | 5/2007 | Zuberi ................ B01D 53/944 422/177 |
| 2008/0307760 | A1 | 12/2008 | Chatlani et al. |
| 2010/0058745 | A1 | 3/2010 | Kim |
| 2012/0240539 | A1 | 9/2012 | Kikuchi |
| 2012/0306123 | A1 | 12/2012 | Maurey et al. |
| 2014/0065353 | A1 | 3/2014 | Bubb et al. |
| 2015/0121827 | A1 | 5/2015 | Cai et al. |

FOREIGN PATENT DOCUMENTS

| | | | |
|---|---|---|---|
| CN | 102884021 | A | 1/2013 |
| EP | 677498 | A2 | 10/1995 |
| EP | 1484482 | B1 | 4/2009 |
| EP | 1598534 | B1 | 4/2010 |
| EP | 1952974 | B1 | 10/2012 |
| EP | 2161420 | B1 | 11/2013 |
| JP | 58-037480 | A | 3/1983 |
| JP | 2010-522106 | | 7/2010 |
| JP | 2010221189 | A | 10/2010 |
| JP | 05082398 | B2 | 11/2012 |
| JP | 5088953 | B2 | 12/2012 |
| JP | 05219741 | B2 | 6/2013 |
| JP | 05249108 | B2 | 7/2013 |
| JP | 05349108 | B2 | 11/2013 |
| JP | 2014094354 | A  * | 5/2014 |
| JP | 2014094354 | A | 5/2014 |
| JP | 2015-531745 | A | 11/2015 |
| WO | 2014/003836 | A1 | 1/2014 |

OTHER PUBLICATIONS

Machine translation of JP2014094354A (Year: 2014).*
English Translation of JP2015512792 Office Action dated Mar. 20, 2018, Japan Patent Office, 3 PGS.
International Search Report and Written Opinion of the International Searching Authority; PCT/US2015/048009; dated Nov. 20, 2015; 11 Pages; European Patent Office .
English Translation of CN201580059740.5 First Office Action dated Sep. 29, 2018, China Patent Office, 9 PGS.

* cited by examiner

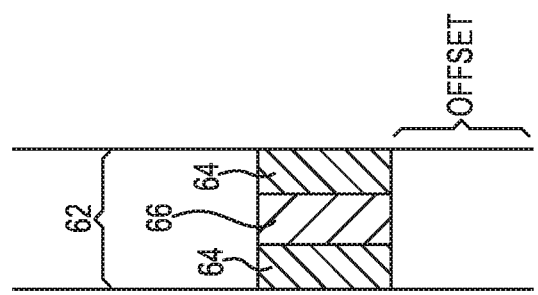
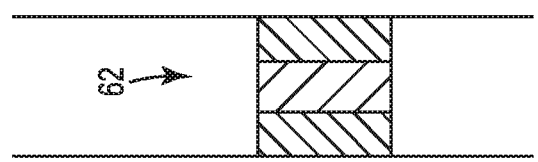
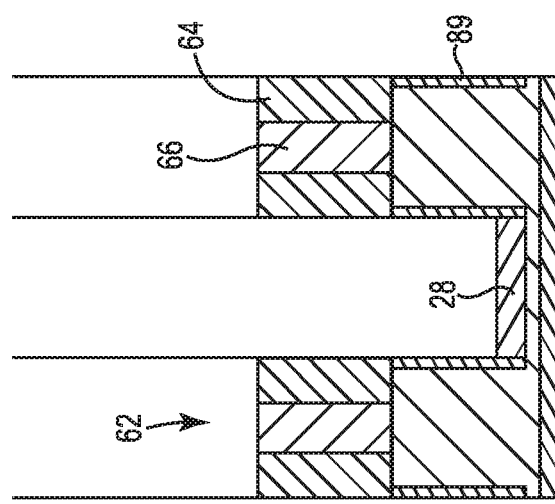
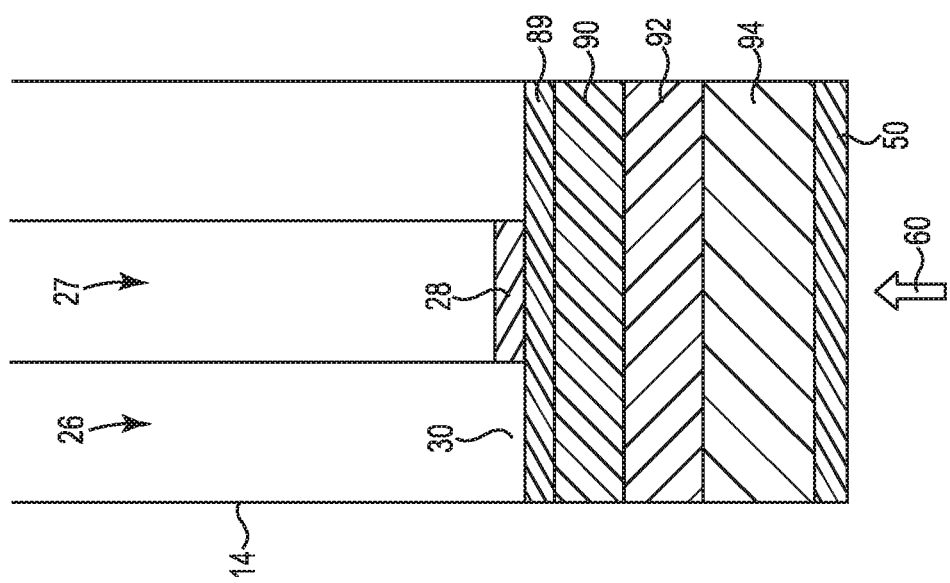

HONEYCOMB BODY HAVING LAYERED PLUGS AND METHOD OF MAKING THE SAME

CROSS REFERENCE TO RELATED APPLICATION

This application claims the benefit of priority under 35 U.S.C. § 365 of International Patent Application Serial No. PCT/US2015/048009, filed on Sep. 2, 2015, designating the United States of America, which in turn claims the benefit of priority under 35 U.S.C. § 119 of U.S. Provisional Patent Application Ser. No. 62/045,233, filed on Sep. 3, 2014, the contents of which are relied upon and incorporated herein by reference in their entirety.

BACKGROUND

Field

Exemplary embodiments of the present disclosure relate to honeycomb bodies having layered plugs and method of making the same.

Discussion of the Background

Ceramic wall flow filters can be used for the removal of particulate pollutants from diesel, gasoline, or other combustion engine exhaust streams. There are a number of different approaches for manufacturing such filters from channeled honeycomb structures formed of porous ceramics. For example, one approach is to position cured plugs of sealing material at the ends of alternate channels of such structures, which can block direct fluid flow through the channels and force the fluid stream through the porous channel walls of the honeycombs before exiting the filter.

The after-treatment of exhaust gas from internal combustion engines may use catalysts supported on high-surface area substrates and a catalyzed filter for the removal of carbon soot particles. Catalyst supports may be refractory, thermal shock resistant, stable under a range of $pO_2$ conditions, non-reactive with the catalyst system, and offer low resistance to exhaust gas flow. Porous ceramic flow-through honeycomb substrates and wall-flow honeycomb filters (generically referred to herein as honeycomb bodies) may be used in these applications.

Aspects of plugging honeycomb structures include plug depth and plug quality. Plug quality is often correlated to the presence of voids in the plugs. In general, the presence of voids can be reduced by reducing the amount of water in the plugging composition and/or increasing the particle size of certain batch components in the plugging composition. However, such modifications can lead to plugs with insufficient depth and, hence, insufficient mechanical (or "push out") strength.

On the other hand, shorter plugs can provide less back pressure and higher filter volume for the same external geometry, thus reducing the frequency of regenerations and improving fuel economy. Moreover, shorter plugs provide better material utilization, thereby reducing filter manufacturing costs. Accordingly, it may be desirable to provide plugs that are as short as possible while still having the requisite depth to provide sufficient mechanical (or "push out") strength.

Ceramic cement may be used to form an exterior skin of a honeycomb body which has been machined or "contoured" to a desired dimension, or an exterior skin may be co-extruded with the honeycomb body. As used herein, the term "honeycomb body" includes single honeycomb monoliths and honeycomb bodies formed by multiple honeycomb segments that are secured together, such as by using a ceramic cement to form a segmented monolith.

The above information disclosed in this Background section is only for enhancement of understanding of the background of the claimed invention and therefore it may contain information that does not form any part of the prior art nor what the prior art may suggest to a person of ordinary skill in the art.

SUMMARY

Exemplary embodiments of the present disclosure provide a honeycomb body comprising layered plugs.

Exemplary embodiments of the present disclosure also provide a method of making a honeycomb body comprising layered plugs.

Additional features of the invention as claimed will be set forth in the description which follows, and in part will be apparent from the description, or may be learned by practice of the claimed invention.

An exemplary embodiment discloses a porous ceramic honeycomb body, including intersecting walls that form channels extending axially from a first end face to a second end face and plugs to seal at least one of a first portion of the channels at the first end face and a second portion of the channels at the second end face. The plugs include a first layer disposed on the walls of respective channels, and a second layer disposed inward toward an axial center of each respective channel on the first layer.

An exemplary embodiment also discloses a method of plugging a porous ceramic honeycomb body comprising intersecting walls that form channels extending axially from a first end face to a second end face. The method includes disposing a first layer patty on a second layer patty, disposing the second layer patty on a support, and pressing the support and the porous ceramic honeycomb body together in an axial direction a predetermined distance to inject the first layer and the second layer in at least one of a first portion of the channels at the first end face and a second portion of the channels at the second end face to form plugs to seal the at least one of the first portion of the channels at the first end face and the second portion of the channels at the second end face. The plugs include a first layer of the first layer patty composition disposed on the walls of respective channels, and a second layer of the second layer patty composition disposed inward toward an axial center of each respective channel on the first layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this specification, illustrate exemplary embodiments of the disclosure, and together with the description serve to explain the principles of the disclosure.

FIGS. 13A-13C show a cross-sectional side view of a method of plugging a honeycomb body with offset layered plugs. FIG. 13A shows a cross-sectional side view of the honeycomb body having a first end face covered by a mask, and a first sacrificial layer disposed on a first layer patty disposed on a second layer patty disposed on a second sacrificial layer. The second sacrificial layer is disposed on a piston assembly of a plugging machine according to exemplary embodiments of the present disclosure. FIG. 13B shows the first sacrificial layer and the first layer patty material on the channel walls within select channels of the honeycomb body and the second layer patty material inward toward an axial center of each respective channel on the first layer according to exemplary embodiments of the present disclosure. The layered plug of each respective channel is shown spaced apart from the first end face by the first and second sacrificial layer patty material according to exemplary embodiments of the present disclosure. FIG. 13C shows the layered plug of each respective channel spaced apart from the first end face according to exemplary embodiments of the present disclosure.

DETAILED DESCRIPTION

Figure 1:
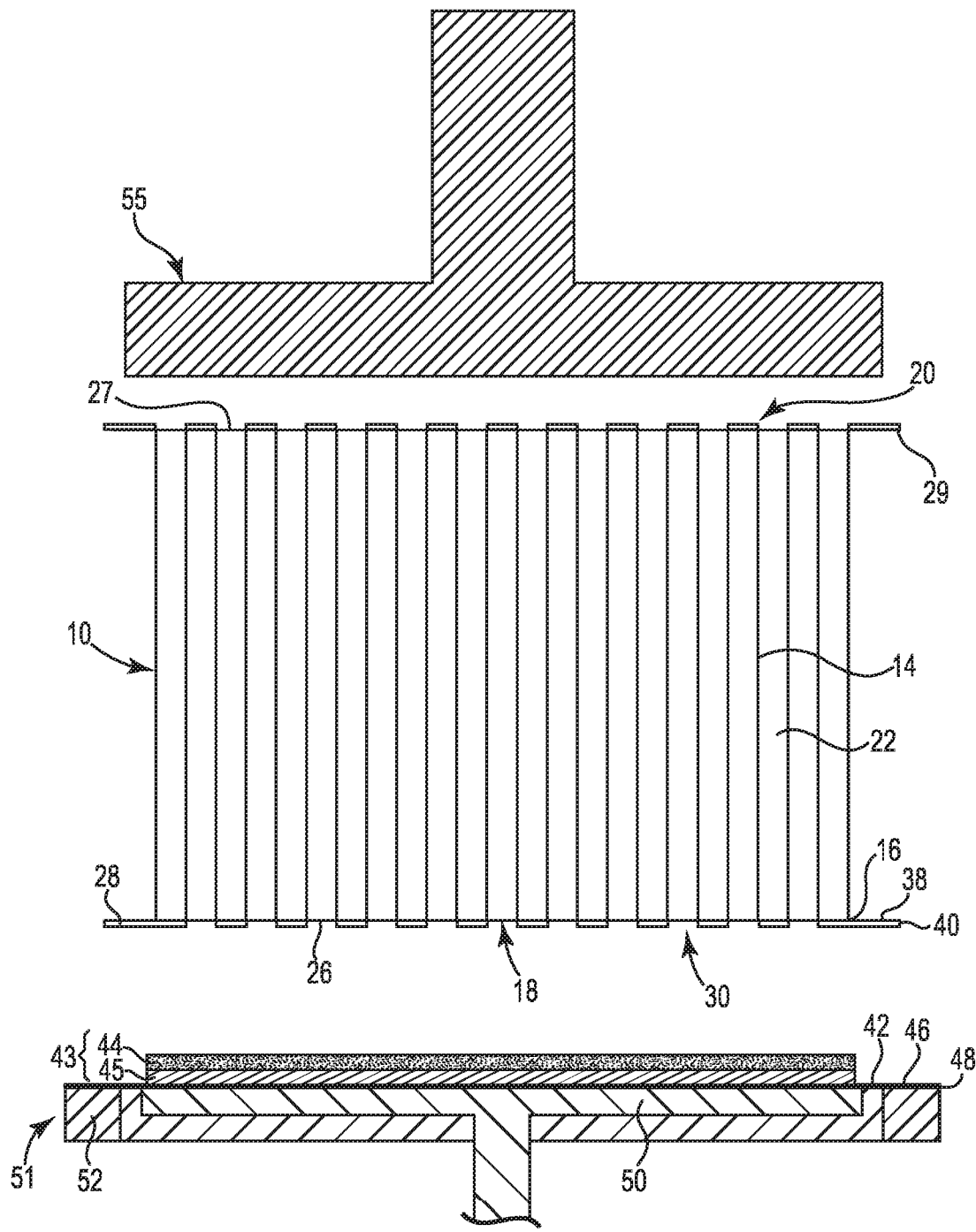
FIG. 1 is a cross-sectional side view showing a honeycomb body as covered by a mask, and a first layer patty disposed on a second layer patty supported on a film-covered piston assembly and a backup plate of a plugging machine according to exemplary embodiments of the present disclosure.

The disclosure is described more fully hereinafter with reference to the accompanying drawings, in which exemplary embodiments of the disclosure are shown. This disclosure may, however, be embodied in many different forms and should not be construed as limited to the exemplary embodiments set forth herein. Rather, these embodiments are provided so that this disclosure is thorough, and will fully convey the scope of the disclosure to those skilled in the art. In the drawings, the size and relative sizes of layers and regions may be exaggerated for clarity.

It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present. It will be understood that for the purposes of this disclosure, "at least one of X, Y, and Z can be construed as X only, Y only, Z only, or any combination of two or more items X, Y, and Z (e.g., XYZ, XYY, XY, YZ, ZZ, etc.).

Honeycomb bodies for solid particulate filters, such as the filter body 10 (FIG. 1), and other applications may be formed of a variety of materials including ceramics, glass-ceramics, glasses, metals, and by a variety of methods depending upon the material selected. Honeycomb bodies having uniform thin, porous, and interconnected walls for solid particulate filtering applications can be fabricated from plastically formable and sinterable finely divided particles of substances that yield a porous, sintered material after being fired to affect their sintering. Suitable materials include metallics, ceramics, glass-ceramics, and other ceramic based mixtures. A method of forming such a ceramic honeycomb monolith from an extruded cordierite material for solid particulate filtering applications is described and claimed, for example, in U.S. Pat. No. 5,258,150 co-assigned to the present assignee, the entire contents of which is incorporated by reference as if fully set forth herein.

According to embodiments of the disclosure, at least one of the first end face 18 is covered with a first mask 28 and the second end face 20 is covered with a second mask 29 as shown in FIG. 1, wherein the covering step can comprise forming the masks 28, 29 according to the processes as described in U.S. Pat. Nos. 4,557,773 and 6,673,300, both co-assigned to the present assignee and the entire contents of which are incorporated by reference as if fully set forth herein. In the illustrated example, the first end face 18 is covered by the mask 28 that includes an adhesive backed, pressure-sensitive thin transparent or translucent film formed from a thermoplastic material, for example, a polyester or PET material. However, other materials such as polyethylene, polypropylene, or polyurethane may be employed. Openings are created through the mask corresponding to a selected first subset 26 of cell channels 22 by means of an opening forming tool (for example, a laser) controlled by an optical image analyzer, as described in the references noted above.

An exemplary mask 28 includes openings 30 positioned so as to coincide with the ends of the first subset 26 of cell channels 22 which are to be charged with plugging material. The openings 30 can be suitably sized to expose the open ends of the first subset 26 of the cell channels 22 but not so large as to expose adjacent cell channels 22. It should be noted that larger openings can be provided to expose several adjacent cell channels 22 if desired. The mask 28 includes an outer edge 38 and an outer periphery 40 that extends radially outwardly from the outer edge 16 of the first end face 18.

The body of the mask 28 is adhered to intersecting matrix of walls 14 of the honeycomb structure 10 to hold the mask 28 in position. The mask can be adhered with acrylic adhesive or any similar adhesive substance, and, in one embodiment, is applied to the mask 28 before placing the mask on the substrate 10.

The next step involves forming plugs within the selected subset of cell channels 22. A thin film material 42, for example, comprising a PET, polyethylene (plastic) coated paperboard, or the like, is covered by a layered patty 43. The layered patty 43 can comprise, for example, a first flat patty of a plugging material 44, comprising a ceramic raw material with an aqueous binder, such as methylcellulose, plasticizer and water, the first flat patty disposed on a second flat patty of a plugging material 45, comprising a ceramic raw material with an aqueous polymeric binder, such as methylcellulose, plasticizer and water. Composition of the first and second flat patty materials 44, 45 are described in greater detail below. The film material 42 includes an outer periphery 46 and an outer edge 48 each extending outwardly from the outer edge 16 of the substrate body 10, as described below. As illustrated, the layered patty 43 of first and second flat patty plugging material 44, 45 is located with respect to the film material 42 such that the outer periphery 46 of the film material 42 is free from the layered plug material 43. In the illustrated example, the first and second flat patty material 44, 45 of the layered patty 43 are provided in the form of a flat patty of a uniform thickness; however, varying thicknesses may also be used.

Figure 2:
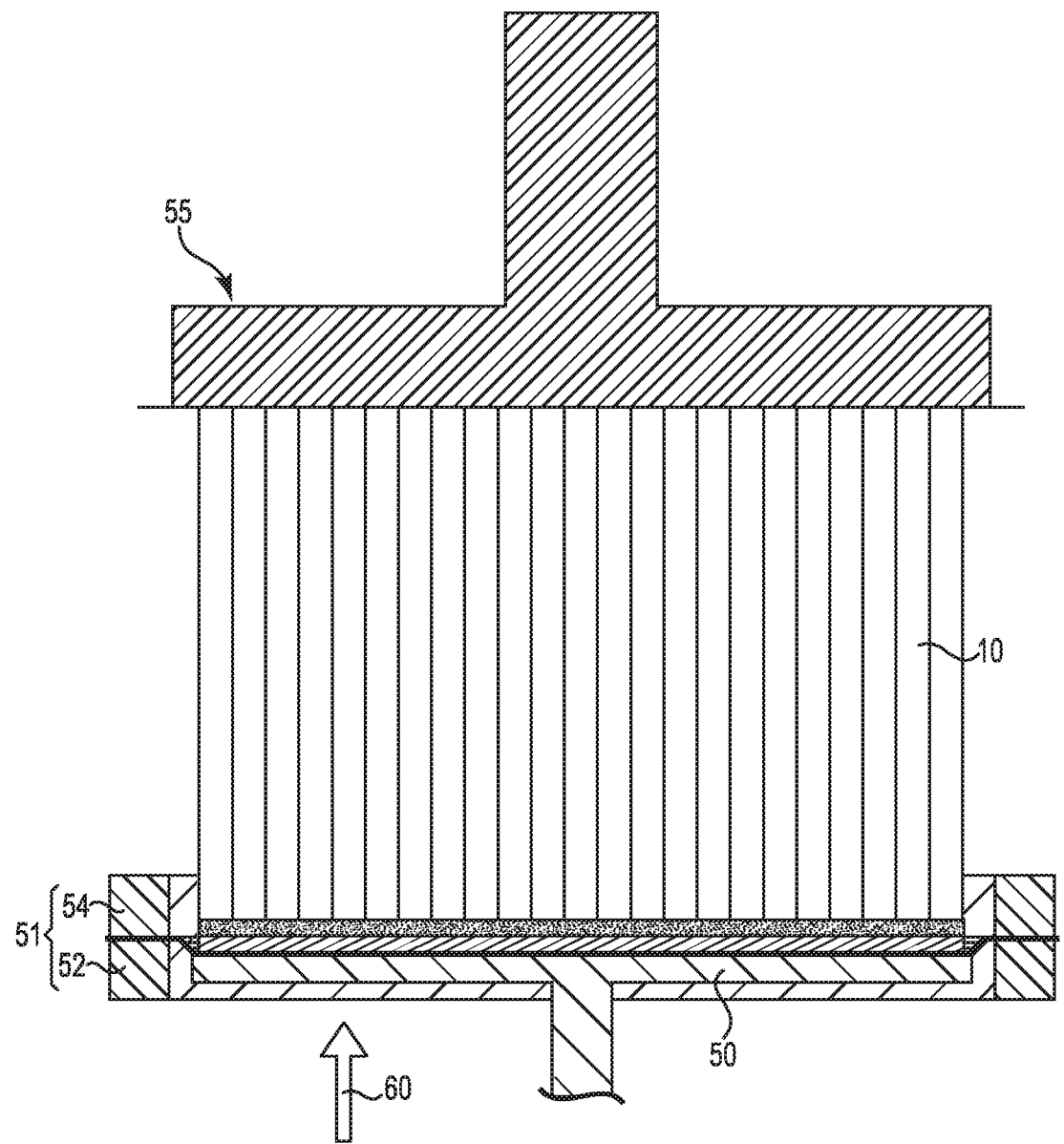
FIG. 2 is a cross-sectional side view showing the honeycomb body in the plugging machine of FIG. 1, wherein peripheral edges of the mask are sealed with edges of the thin film according to exemplary embodiments of the present disclosure.
Figure 3:
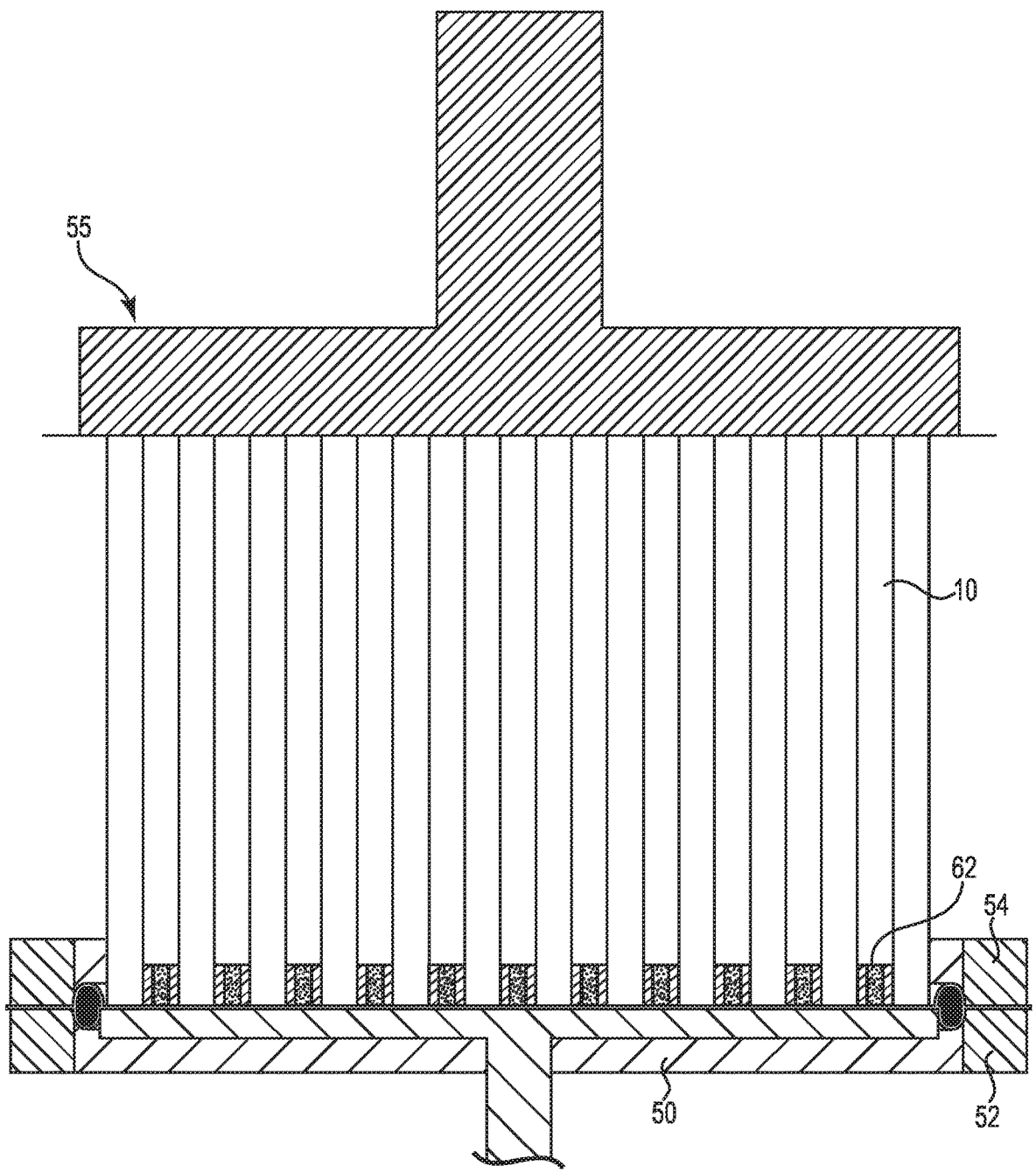
FIG. 3 is a cross-sectional side view showing the honeycomb body in the plugging machine of FIG. 1, wherein the first layer patty material is located on the channel walls within select channels of the honeycomb body and the second layer patty material is located inward toward an axial center of each respective channel on the first layer according to exemplary embodiments of the present disclosure.
Figure 4:
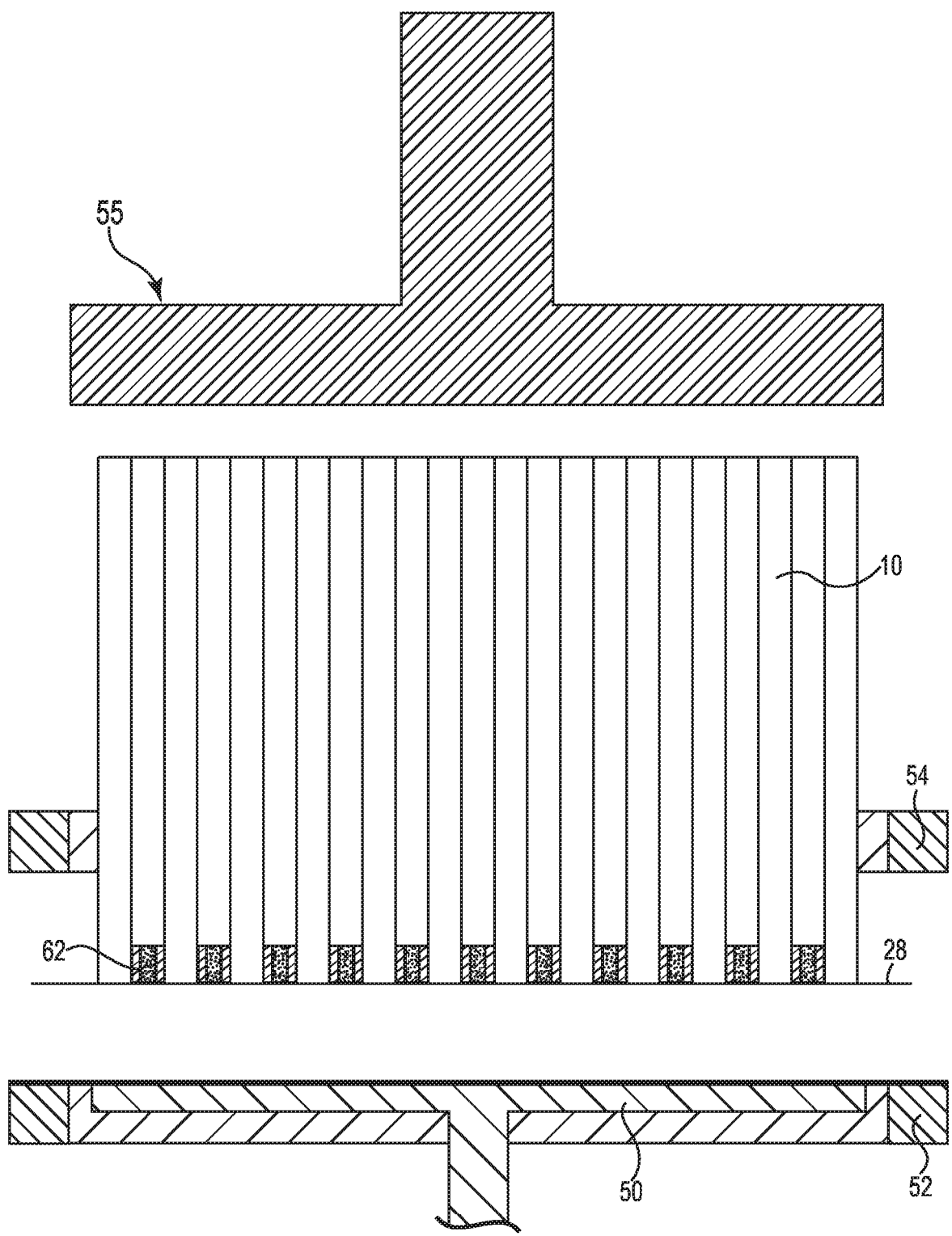
FIG. 4 is a cross-sectional side view showing the honeycomb body in the plugging machine of FIG. 1 with clamp ring open, wherein layered plugs of first layer patty material located on the channel walls within select channels of the honeycomb body and second layer patty material located inward toward an axial center of each respective channel on the first layer seal the select channels according to exemplary embodiments of the present disclosure.

The film material 42 with the layered plug material 43 thereon is situated upon a servo-driven piston based plugging machine that includes a planar, piston 50 that is surrounded by a clamping assembly 51 having a first clamping portion 52 and a second clamping portion 54 as shown in FIGS. 2, 3, and 4. Piston 50 can be shaped to correspond to the honeycomb structure being plugged and can be roughly of a comparable size to the part. The first and second clamping portions 52, 54 of the clamping assembly 51 are used to seal the outer periphery 40 of the mask 28 with the outer periphery 46 of the film material 42. A force in a direction and as represented by directional arrow 60 is exerted on the film material 42 by the piston 50, thereby forcing the layered plugging material 43 through the openings 30 of the mask 28 and charging the first subset 26 of the cell channels 22 of the honeycomb structure 10 (FIG. 3) and forming the plurality of layered plugs 62. A backup plate 55 can be used to anchor the honeycomb body 10.

The piston 50 is then retracted away from the first end face 18 of the honeycomb structure 10 and the mask 28 and the film material 42 are removed from the end of the filter body 10. The filter body 10 may then be removed from within the associated plugging machine. It should be noted that the honeycomb structure 10 may be positioned in any orientation during the plugging process, including vertically and horizontally, and further that the second subset 27 of the cell channels 22 located at the second end face 20 may be plugged simultaneously with the first subset 26 of the cell channels 22, thereby significantly decreasing the overall cycle time of the plugging process.

In FIG. 4 the honeycomb body 10 is shown in the plugging machine of FIG. 1 with clamping ring assembly 51 open. The layered plugs 62 of first layer patty material 44 located on the channel walls 14 within select channels of the honeycomb body 10 and second layer patty material 45 located inward toward an axial center of each respective channel 22 on the first layer 44 seal the select channels 26 according to exemplary embodiments of the present disclosure.

Figure 5:
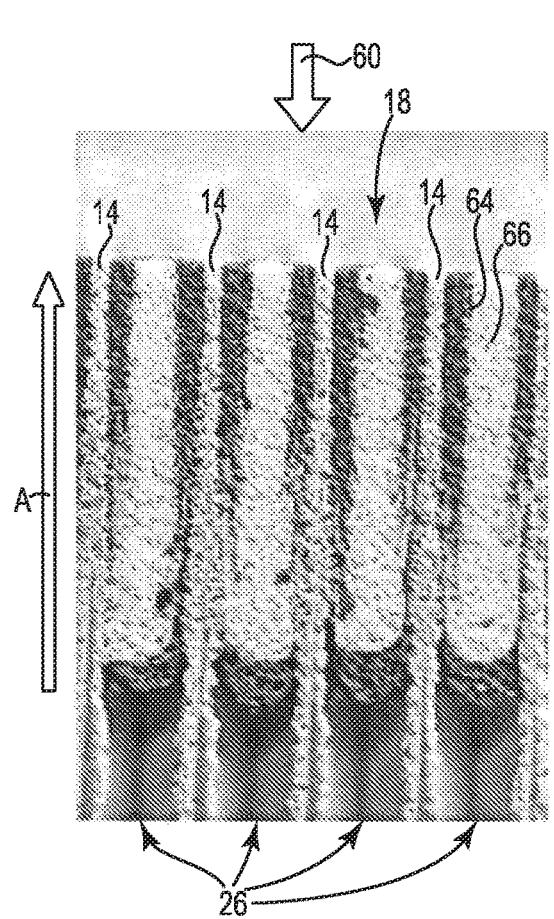
FIG. 5 is a photograph of a sectioned honeycomb body at an end face showing layered plugs that seal select channels, wherein the channels are sectioned on the 45° angle of square channels according to exemplary embodiments of the present disclosure.

FIG. 5 is a photograph of a sectioned honeycomb body at an end face showing layered plugs that seal select channels, wherein the channels are sectioned on the 45° angle of square channels according to exemplary embodiments of the present disclosure. The channels 22 extent in the axial direction "A" of the honeycomb body 10. The shown cross section of an example of multilayer plugs was made using a 2 mm patty of a first cement composition shown as black in the photograph with a 2 mm patty of a second cement composition shown as white in the photograph on top (relative to a plugging direction 60). The first cement composition (black) that does not contact the walls (due to the mask) flows all the way to the bottom of the plug resulting in a tip of first cement composition, but once the cement of the first composition contacts the wall, it builds up and does not readily slide down the wall. This results in the buildup of the first cement composition on the channel wall at the inlet face and the second cement composition (white) flowing through the middle of the channel. Based on this exemplary flow, many advantages can be achieved over single (non-layered) plugs as will be described further below.

Figure 6:
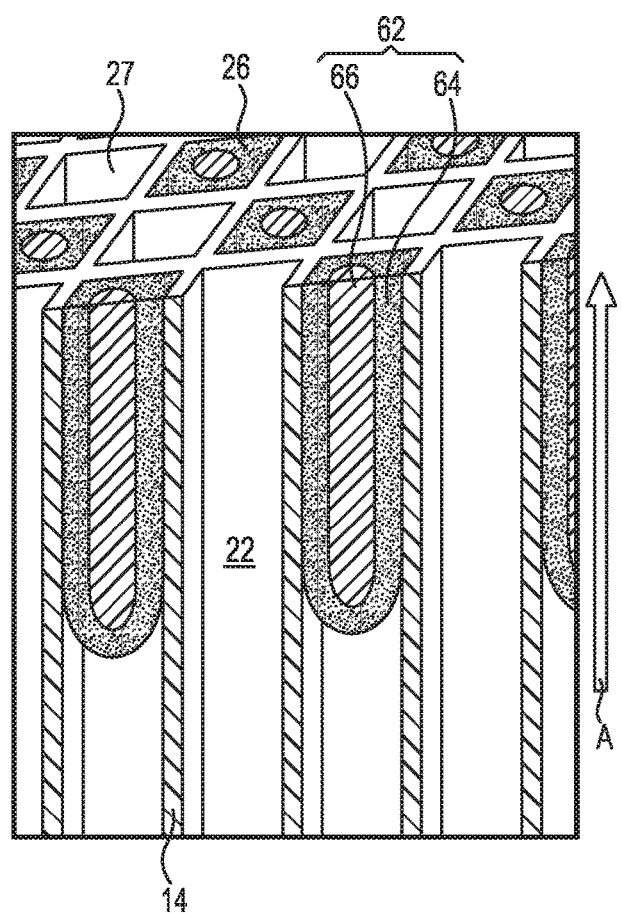
FIG. 6 is a schematic of a sectioned honeycomb body at an end face showing layered plugs that seal select channels, wherein the channels are sectioned on the 90° angle of square channels according to exemplary embodiments of the present disclosure.

FIG. 6 is a schematic of a sectioned honeycomb body at an end face showing layered plugs that seal select channels, wherein the channels are sectioned on the 90° angle of square channels according to exemplary embodiments of the present disclosure. FIG. 6 shows a first layer 64 of first layer patty material 44 disposed on the walls 14 of respective channels 22, and a second layer 66 of second layer patty material 45 disposed inward toward an axial center of each respective channel 22 on the first layer 64. While the illustrated embodiments have described layered plugs 62 seal the select channels 26 at the first end face 18 according to exemplary embodiments of the present disclosure, a second portion of channels 27 are sealed at the second end face 20 in a like manner, the further details of which are omitted here.

According to exemplary embodiments compositions of the first and second flat patty materials 44, 45 that form the first and second plug layers 64, 66, are now described in greater detail. The compositions can include a refractory filler having a particle size distribution, an organic binder, an inorganic binder, and a liquid vehicle.

The refractory filler, the particle size distribution of the refractory filler, the organic binder, and the inorganic binder are selected such that, when the composition including the active material is applied to plug a plurality of channels of the honeycomb body, a plurality of plugs formed therefrom have the desired properties, such as plug depth variability, plug depth, push-out strength, coefficient of thermal expansion (CTE), porosity, permeability, etc.

The refractory filler can include at least one inorganic powder. The inorganic powder may, for example, include a ceramic, i.e., pre-reacted or ceramed, refractory powder. In other embodiments, the powders can be refractory glass powders, or glass-ceramic powders. Still further, in other embodiments the inorganic powder batch mixture can comprise any combination of two or more of the aforementioned refractory powders. Exemplary refractory powders may include cordierite, mullite, aluminum titanate, silicon carbide, silicon nitride, calcium aluminate, beta-eucryptite, and beta-spodumene.

According to embodiments, the refractory filler can include an active material. The active material becomes incorporated in to form the structure of the respective plug layer. The active material can be at least one of catalytically active and chemically active and material that is at least one of catalytically active and chemically active is referred to herein as active material. The active plug layer is more than simply inactive or non-active material (inert) coated with an active material. In other words, a batch cement composition that forms a plug layer includes the active material. The active material is incorporated in and forms the structure of the active plugs.

The active material in the active layer can, for example, be a zeolite. The active material can be small pore zeolite such as copper-chabazite zeolite (CuCHA), present as catalyst for the selective catalytic reduction of NOx, Cu-exchanged zeolite, Fe-exchanged zeolite, a hydrocarbon-adsorbing zeolite, a high-surface-area material such as alumina, ceria, or zirconia with dispersed precious-metal such as Pt, Pd, or Rh, high surface area titania with vanadia, rhodium-titania, calcium carbonate, HC traps, high surface area material plus a noble metal, high surface area material, on board diagnosis oxygen storage material, ceria:zirconia solid solution material, ceria and zirconia multi-phase material, a three way catalyst (TWC), an alkali earth metal oxide such as potassium carbonate:cobalt oxide:lanthanum oxide, and the like, or mixtures thereof.

The compositions further comprise a binder component comprised of an inorganic binder. In some embodiments, the inorganic binder is a gelled inorganic binder such as gelled colloidal silica. Other embodiments of an inorganic binder could include a non-gelled colloidal silica, a powdered silica, or a low-temperature glass. According to embodiments, the incorporation of a gelled inorganic binder may minimize or even prevent the migration of the inorganic binder particles into microcracks of a honeycomb body on which the composition is applied. Accordingly, as used herein, the term "gelled inorganic binder" refers to a colloidal dispersion of solid inorganic particles in which the solid inorganic particles form an interconnected network or matrix in combination with a continuous fluid phase, resulting in a viscous semi-rigid material. Further, it should be understood that there can be relative levels or degrees of gelation. To that end, since a colloidal dispersion can comprise solid particles having particle sizes diameters less than 150 nm, such as less than 50 nm, and further such as less than 25 nm, and still further such as less than 15 nm, a gelled inorganic binder as used herein comprises an interconnected network of the dispersed inorganic particles that is sufficient to prevent at least a portion of the inorganic binder particles from migrating into microcracks of a honeycomb structure upon which the composition containing the gelled inorganic binder has been applied.

Accordingly, the non-gelled colloidal silica can subsequently be gelled by the addition of one or more gelling agents to the composition. In embodiments, colloidal silica may be gelled by increasing the ion concentration of the composition. In other embodiments, colloidal silica can be gelled by altering the pH of the composition. Still further embodiments can comprise both increasing the ion concentration and altering the pH of the composition. It should be understood that the gelling agent can be used in any amount effective to provide a gelled inorganic binder as described herein.

Exemplary colloidal silicas can include the Ludox® HS, AS, SK, PW50, and PZ50 available from W. R. Grace & Company, and can be gelled by increasing the ion concentration by addition of salts and/or by changing the pH. Ludox® PW50EC, a polydisperse colloidal silica, has a much broader particle size range than the small silica particle size of Ludox® HS-40. Ludox® PW50EC has a particle size range $D_{50}$ of approximately 10-100 nm particle size distribution (PSD) as compared to about 12 nm $D_{50}$ in Ludox® HS-40. In theory, the larger particles of Ludox® PW50EC do not migrate as easily leaving them dispersed and in the bulk cement mixture. The smallest of the particles in the Ludox® PW50EC are still able to migrate and migrate into the substrate.

Exemplary compositions disclosed herein may further comprise an organic binder. The addition of the organic binder component can further contribute to the cohesion and plasticity of the composition prior to firing. This improved cohesion and plasticity can, for example, improve the ability to shape the composition. This can be advantageous when utilizing the composition to form skin coatings or when plugging selected portions (such as the ends) of a honeycomb structural body. Exemplary organic binders include cellulose materials. Exemplary cellulose materials include cellulose ether binders such as methylcellulose, hydroxypropyl methylcellulose, methylcellulose derivatives, and/or any combinations thereof. For example, cellulose materials include combination of methylcellulose and hydroxypropyl methylcellulose. For example, the organic binder can be present in the composition as a super addition in an amount in the range of from 0.1 weight percent to 5.0 weight percent of the inorganic powder batch composition, or even in an amount in the range of from 0.5 weight percent to 2.0 weight percent of the inorganic powder batch composition.

An exemplary liquid vehicle for providing a flowable or paste-like consistency to the disclosed compositions is water, although other liquid vehicles can be used. To this end, the amount of the liquid vehicle component can vary in order to provide optimum handling properties and compatibility with the other components in the batch mixture. According to some embodiments, the liquid vehicle content is present as a super addition in an amount in the range of from 15% to 60% by weight of the inorganic powder batch composition, or even according to some embodiments can be in the range of from 20% to 50% by weight of the inorganic powder batch mixture. Minimization of liquid components in the compositions can also lead to further reductions in the drying shrinkage of the compositions during the drying process.

Exemplary compositions disclosed herein can optionally comprise one or more processing aids such as a plasticizer, lubricant, surfactant, sintering aid, rheology modifier, thixotropic agent, dispersing agents, or pore former. An exemplary plasticizer for use in preparing the plugging composition is glycerine. An exemplary lubricant can be a hydrocarbon oil or tall oil. Exemplary commercially available lubricants include Liga GS, available from Peter Greven Fett-Chemie and Durasyn® 162 hydrocarbon oil available from Innovene. A commercially available thixotropic agent is Benaqua 1000 available from Rheox, Inc. A pore former, may also be optionally used to produce a desired porosity of the resulting ceramed composition. Exemplary and non-limiting pore formers can include graphite, starch, polyethylene beads, and/or flour. Exemplary dispersing agents that can be used include the NuoSperse® 2000 from Elementis and ZetaSperse® 1200, available from Air Products and Chemicals, Inc.

To prepare exemplary compositions as disclosed herein, the inactive and active components as described above can be mixed together, the inorganic powder batch mixture as described above can be mixed together with the organic binder, followed by the incorporation of the liquid vehicle and inorganic binder components. As mentioned above, the inorganic binder can be non-gelled or gelled either before or after having been introduced into the composition. If the inorganic binder is to be gelled prior to addition to the composition, the one or more gelling agents can be added to the inorganic binder, such as for example, a colloidal silica. Alternatively, if the inorganic binder is to be gelled after addition to the powder composition, the one or more gelling agents can be introduced directly into the composition. Any optional processing aids can also be introduced into the composition during or after the liquid addition. However, if desired a rheology modifier, such as polyvinyl alcohol can first be mixed with the inorganic binder and, optionally the refractory powder. Once the desired components are combined, the composition can be thoroughly mixed to provide a flowable paste-like consistency to the composition. In an exemplary embodiment, the mixing as described above can be done using a Littleford mixer or a Turbula mixer.

Once formed, the compositions disclosed herein can be applied to a honeycomb body or structure defining a plurality of cell channels bounded by cell channel walls as described above. In exemplary embodiments, the compositions disclosed herein can be used as plugging material to plug selected channels of a honeycomb body in order to form a wall flow filter. In some embodiments, a first portion of the plurality of cell channels can comprise layered plugs sealed to the respective channel walls at or near the upstream inlet end to form outlet cell channels. A second portion of the plurality of cell channels can also comprise layered plugs sealed to the respective channel walls at or near the downstream outlet end to form inlet cell channels. Other configurations having only one end plugged, as well as partially plugged configurations (having some unplugged channels) are also contemplated.

Figure 7:
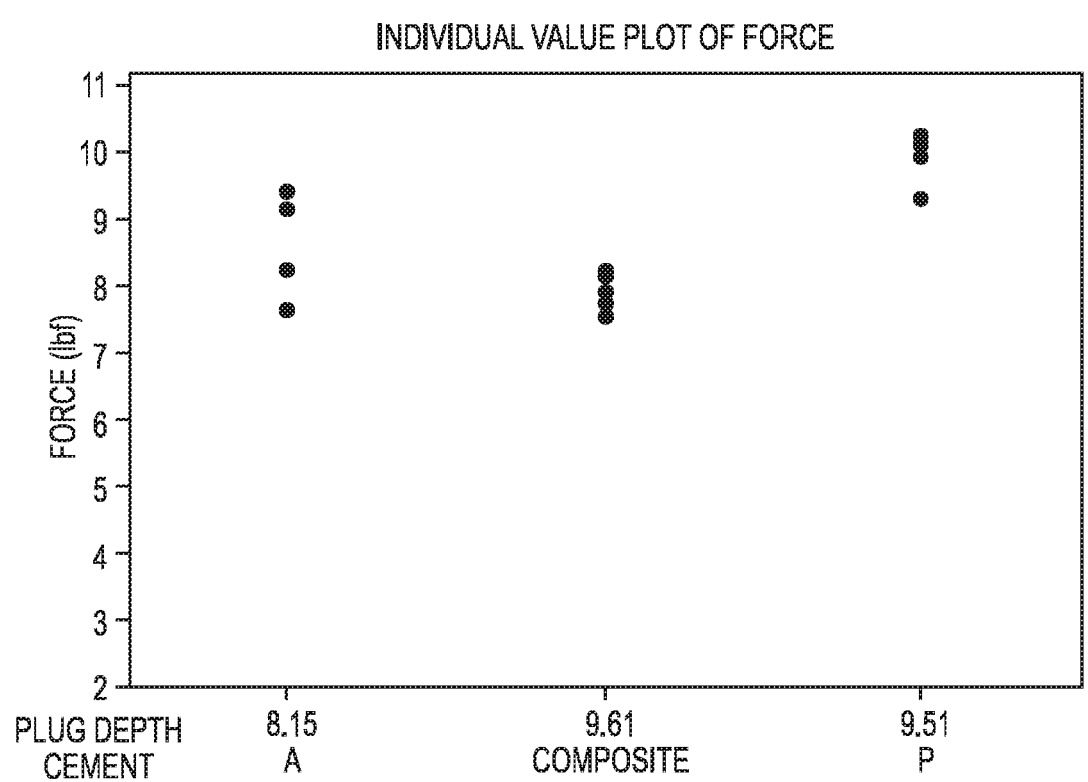
FIG. 7 is a graphical plot of data showing a comparison of plug strength among a plug composition of gelled colloidal inorganic binder (A), a plug composition of a non-gelled colloidal inorganic binder (P), and a layered plug including a first layer having the composition of gelled colloidal inorganic binder in contact with the channel wall and a second layer having the composition of non-gelled colloidal inorganic binder in the interior according to exemplary embodiments of the present disclosure.

In exemplary embodiments of the porous ceramic honeycomb body the first layer 64 comprises a first composition and the second layer 66 comprises a second composition. FIG. 7 is a graphical plot of data showing a comparison of plug strength among a plug composition of gelled colloidal inorganic binder (A), a plug composition of a non-gelled colloidal inorganic binder (P), and a layered plug 62 including a first layer 64 having the composition of gelled colloidal inorganic binder in contact with the channel wall 14 and a second layer 66 having the composition of non-gelled colloidal inorganic binder in the interior according to exemplary embodiments of the present disclosure. The exemplary layered plug 62 combination shown in FIG. 7 does not significantly change plug strength from either single layer composition plug on its own.

Figure 8:
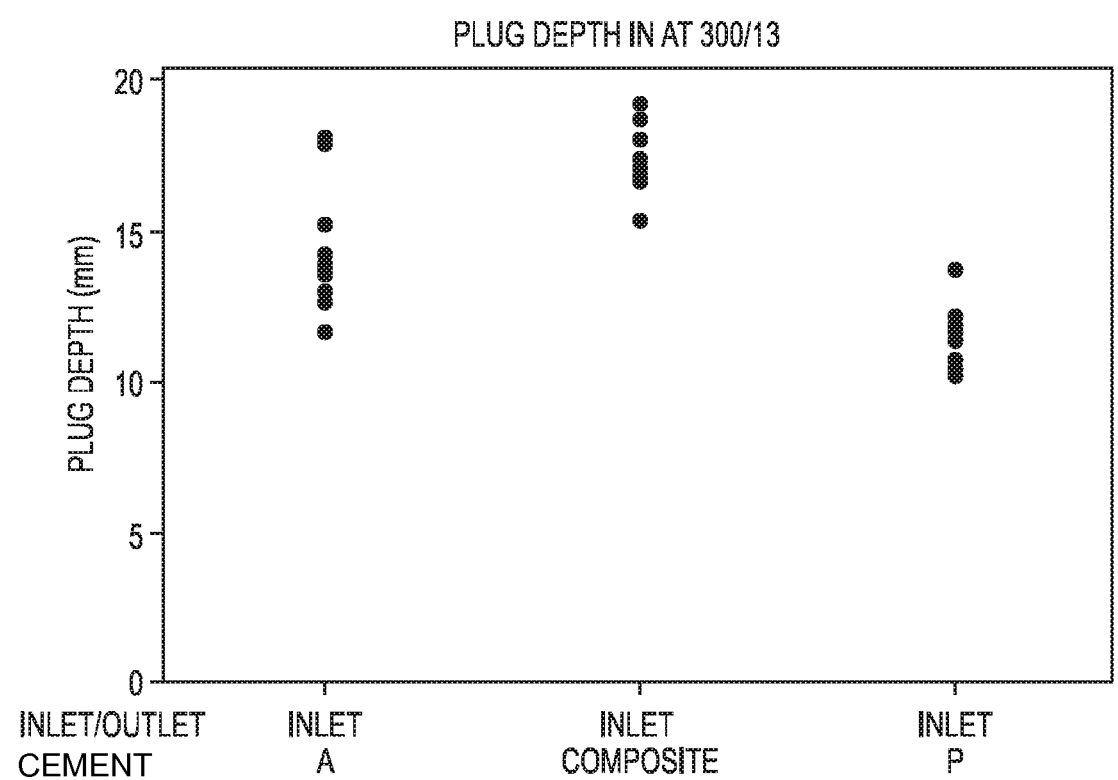
FIG. 8 is a graphical plot of data showing a comparison of plug depth among a plug composition of gelled colloidal inorganic binder (A), a plug composition of a non-gelled colloidal inorganic binder (P), and a layered plug including a first layer having the composition of gelled colloidal inorganic binder in contact with the channel wall and a second layer having the composition of non-gelled colloidal inorganic binder in the interior according to exemplary embodiments of the present disclosure.

FIG. 8 is a graphical plot of data showing a comparison of plug depth among a plug composition of gelled colloidal inorganic binder (A), a plug composition of a non-gelled colloidal inorganic binder (P), and a layered plug 62 including a first layer 64 having the composition of gelled colloidal inorganic binder in contact with the channel wall 14 and a second layer 66 having the composition of non-gelled colloidal inorganic binder in the interior according to exemplary embodiments of the present disclosure. The exemplary layered plug 62 combination shown in FIG. 8 results in enhanced plug depth capability compared to either composition separately.

Figure 9:
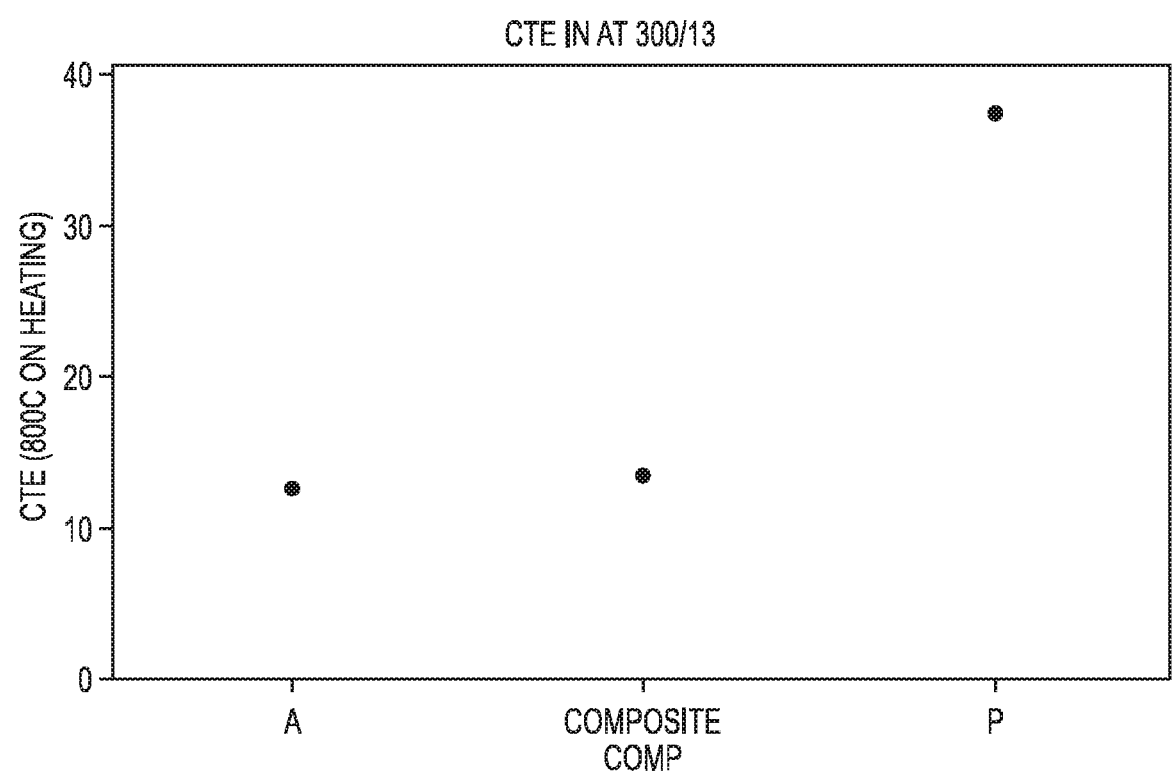
FIG. 9 is a graphical plot of data showing a comparison of coefficient of thermal expansion (CTE) in an aluminum-titanate honeycomb body among a plug composition of gelled colloidal inorganic binder (A), a plug composition of a non-gelled colloidal inorganic binder (P), and a layered plug including a first layer having the composition of gelled colloidal inorganic binder in contact with the channel wall and a second layer having the composition of non-gelled colloidal inorganic binder in the interior according to exemplary embodiments of the present disclosure.

FIG. 9 is a graphical plot of data showing a comparison of coefficient of thermal expansion (CTE) in an aluminum-titanate honeycomb body among a plug composition of gelled colloidal inorganic binder (A), a plug composition of a non-gelled colloidal inorganic binder (P), and a layered plug 62 including a first layer 64 having the composition of gelled colloidal inorganic binder in contact with the channel wall 14 and a second layer 66 having the composition of non-gelled colloidal inorganic binder in the interior according to exemplary embodiments of the present disclosure. The exemplary layered plug 62 combination shown in FIG. 9 results in maintaining the CTE of the gelled cement with a mostly non-gelled interior.

According to exemplary embodiments the composition of the first flat patty material 44 can comprise a passivation material such that when the first plug layer 64 is formed, the passivation material can prevent components of the composition of the second flat patty material 46 from infiltrating into fine pore and microcrack structures of the honeycomb body wall 14. As a further exemplary embodiment, the composition of the first flat patty material 44 can comprise a transitory component capable of removal through at least one of thermal treatment and chemical treatment.

According to exemplary embodiments compositions of the first and second flat patty materials 44, 45 that form the first and second plug layers 64, 66 can be any combination of compositions described in Tables 1 and 2.

TABLE 1

|  | P | A |
|---|---|---|
| Total Batch Weight (g) | 1500 | 1500 |
| Cordierite | 958 | 864 |
| A4M Methocel ® | 14.4 | |
| F240 Methocel ® | | 8.6 |
| Ludox ® PW-50EC | 288 | |

TABLE 1-continued

|  | P | A |
|---|---|---|
| Ludox ® HS-40 |  | 328 |
| Citric Acid |  | 8.8 |
| Triethanoamine 85% |  | 54.6 |
| Water | 240 | 236 |

TABLE 2

| Example | First Layer Composition | Second Layer Composition |
|---|---|---|
| 1 | fine particles | coarse particles |
| 2 | no colloidal silica | colloidal silica |
| 3 | gelled colloidal silica by frozen | non-gelled colloidal silica |
| 4 | gelled colloidal silica by gellant magnesium acetate | P, non-gelled colloidal silica |
| 5 | gelled colloidal silica by gellant citric acid | P, non-gelled colloidal silica |
| 6 | gelled colloidal silica by gellant $CO_2$ | P, non-gelled colloidal silica |
| 7 | anion stabilized colloidal silica | cation stabilized colloidal silica |
| 8 | barrier layer | P, non-gelled colloidal silica |
| 9 | adhesion promoter | A, gelled colloidal silica |
| 10 | no pore former | pore former |
| 11 | lubricating layer | P, non-gelled colloidal silica |
| 12 | lubricating layer | A, gelled colloidal silica |
| 13 | passivation layer or solution | P, non-gelled colloidal silica |
| 14 | passivation layer or solution | A, gelled colloidal silica |
| 15 | standard plug cement | high porosity cement |
| 16 | organic layer | A, gelled colloidal silica |
| 17 | organic layer | P, non-gelled colloidal silica |
| 18 | A, gelled colloidal silica | P, non-gelled colloidal silica |
| 19 | A, fine particles, low porosity, gelled colloidal silica | P, coarse particles, high porosity, non-gelled colloidal silica |

According to exemplary embodiments of the disclosure, multi-layered plugs exhibited advantages over homogeneous or single-composition plugs. Example 1 according to these exemplary embodiments has fine particles of refractory in the wall layer (first layer 64) and coarse refractory particles in the plug core layer (second layer 66). Example 1 exhibits an advantage of having low overall packing density, which is good for light-off, while the coarse particles prevent voids and the fine particles provide adhesion by entering wall 14 matrix voids. Example 2 exhibited coefficient of thermal expansion (CTE) protection similar to that shown in FIG. 9. Examples 3, 4, 5, and 6 also exhibited CTE protection, but further exhibited good flow in the plug core layer. Examples 3, 4, 5, and 6 having different gellants demonstrated that the gellant did not significantly affect these results.

Example 7 demonstrated that in situ gelling enabled stable rheology during transport and CTE protection upon plugging. Example 8 demonstrated a good barrier layer in the wall layer, CTE protection, and the core layer having good flow. Example 9 demonstrated a good adhesion layer in the wall layer, CTE protection, and the core layer having good flow. An adhesion layer may include silicone resin, colloidal silica, and a material that melts in heat treatment such as a glassy phase. Example 10 provided low mass and high bond strength layered plug. Examples 11 and 12 provided increased plug depth. Examples 13 and 14 provided CTE protection as well as improved chip resistance and improved face gouge resistance.

Example 15 enables use of high pore former level in the core layer that contacts exhaust gas first in order to provide fast light-off while allowing reduction in overall organic levels by having the wall layer comprised of standard plug cement. Examples 16 and 17 provide a plug countersunk into the channel after heat treatment. The organic layer, for example, can be a wax. The organic layer may burn off and leave offset plugs, that is, plugs offset axially into the channels spaced apart from the end face. Example 18 provides increased plug depth and CTE protection. Example 19 provides a combination of advantages, for example, as described with respect to Examples 1, 3, 15, and 18.

According to exemplary embodiments of the disclosure, the first layer 64 of the layered plug 62 can comprise a first property and the second layer 66 can comprise a second property different from the first property. That is, for example, the first property may be a first porosity (% P1) and the second property may be a second porosity (% P2). For example, the first property may be a first coefficient of thermal expansion (CTE1) and the second property may be a second coefficient of thermal expansion (CTE2). The first and second properties are not particularly limited and may include density, permeability, elastic modulus (EMOD), thermal shock parameter (TSP), or any other property that may be desirable to control across the layered plug 62.

For example, it may be advantageous to control the coefficient of thermal expansion (CTE) of the layered plug 62 such that the first layer 64 CTE1 more closely matches that of the honeycomb body channel walls 14 (CTE3) than the CTE of the second layer 66 (CTE2). For example, the first layer 64 can comprise a first coefficient of thermal expansion (CTE1) and the second layer 66 can comprise a second coefficient of thermal expansion (CTE2) different from the first coefficient of thermal expansion (CTE1), and the walls 14 can comprise a third coefficient of thermal expansion (CTE3). For example, the coefficient of thermal expansion relationship may be expressed as CTE3≤CTE1<CTE2. In this way face cracks can be reduced or eliminated while providing faster light-off and increased plug strength and durability.

Different materials in the plugs can have different effects on the wall CTE3. For example, it may be advantageous to protect the CTE of the honeycomb body channel walls 14 (CTE3) locally where the plugging cement interacts with the channel walls 14 to reduce or eliminate face cracks while providing faster light-off and increased plug strength and durability. While not wishing to be bound by theory, CTE protection refers to not pinning microcracks. Expansion and contraction of microcracks in the wall 14 can provide a low CTE3. Pinning of microcracks can raise CTE3. Thus, for example, the first layer 64 can comprise a first composition that does not pin microcracks in the wall 14 and the second layer 66 can comprise a second composition that may pin microcracks in the wall 14, but because the second layer 66 does not contact the wall 14, CTE3 is not increased. For example, the first layer 64 can comprise a first composition that pins microcracks in the wall 14 less than the second layer 66 composition, but because the second layer 66 does not contact the wall 14, CTE3 is increased less than if the second layer 66 does contact the wall 14. That is, the first layer 64 can provide a first coefficient of thermal expansion protection (CP1) and the second layer can provide a second coefficient of thermal expansion protection (CP2) different from the first coefficient of thermal expansion (CP1), such that an increase in CTE3 due to localized interaction with the plugging cement composition is reduced or eliminated. For example, the coefficient of thermal expansion protection relationship may be expressed as CP2<CP1, where greater coefficient of thermal expansion protection refers to a smaller increase in the wall CTE3. In this way face cracks can be reduced or eliminated while providing faster light-off and increased plug strength and durability.

In exemplary embodiments the first layer 64 may be a different thickness than the second layer 66. For example, the first layer 64 may be between 0% and 10% of the thickness of the second layer 66. For example, when CTE protection is desired, it may be advantageous to have a very thin first layer 64. While not wishing to be bound by theory, CTE protection refers to not pinning microcracks. In another exemplary embodiment, the first layer 64 may be greater than or equal to 10% of the thickness of the second layer 66. For example, the first layer 64 thickness may be between 10% and 90% of the thickness of the second layer 66. For example, the first layer 64 thickness may be between 30% and 70%, or even between 40% and 60% of the thickness of the second layer 66.

Figure 10:
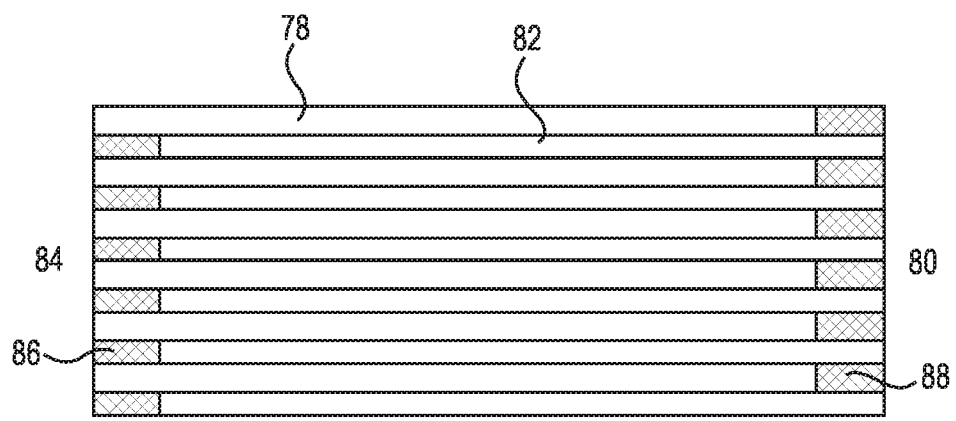
FIG. 10 is a cross-sectional side view schematic of a honeycomb body having inlet channels plugged at an outlet face and outlet channels plugged at an inlet face according to exemplary embodiments of the present disclosure.

FIG. 10 is a cross-sectional side view schematic of a honeycomb body 10 having inlet channels 78 plugged at an outlet face 80 and outlet channels 82 plugged at an inlet face 84 according to exemplary embodiments of the present disclosure. At least a portion of the plugs 86 at the inlet face 84 and the plugs 88 at the outlet face 80 may be layered plugs 62.

Figure 11:
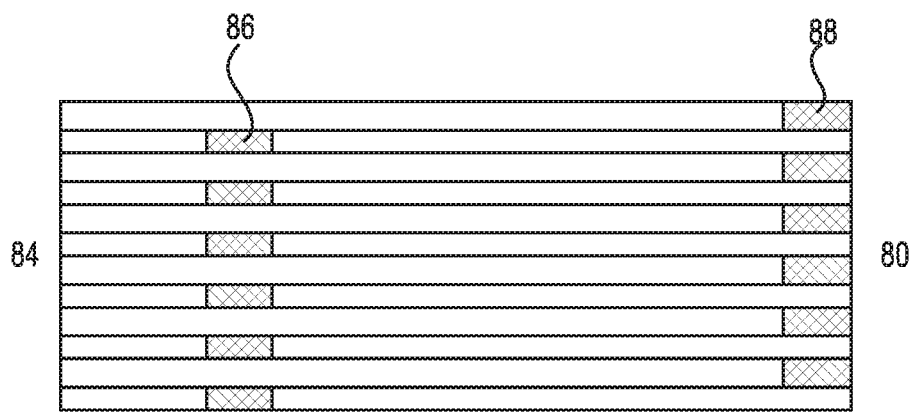
FIG. 11 is a cross-sectional side view schematic of a honeycomb body having inlet channels plugged at the outlet face and outlet channel plugs offset from the inlet face according to exemplary embodiments of the present disclosure.

FIG. 11 is a cross-sectional side view schematic of a honeycomb body 10 having inlet channels 78 plugged at the outlet face 80 and outlet channel plugs 86 offset from the inlet face 84 according to exemplary embodiments of the present disclosure. At least a portion of the outlet channel plugs 86 countersunk axially (offset) from the inlet face 84 and the inlet channel plugs 88 at the outlet face 80 may be layered plugs 62. The plugs can be countersunk from a few millimeters to a few inches (about 100 mm).

Figure 12:
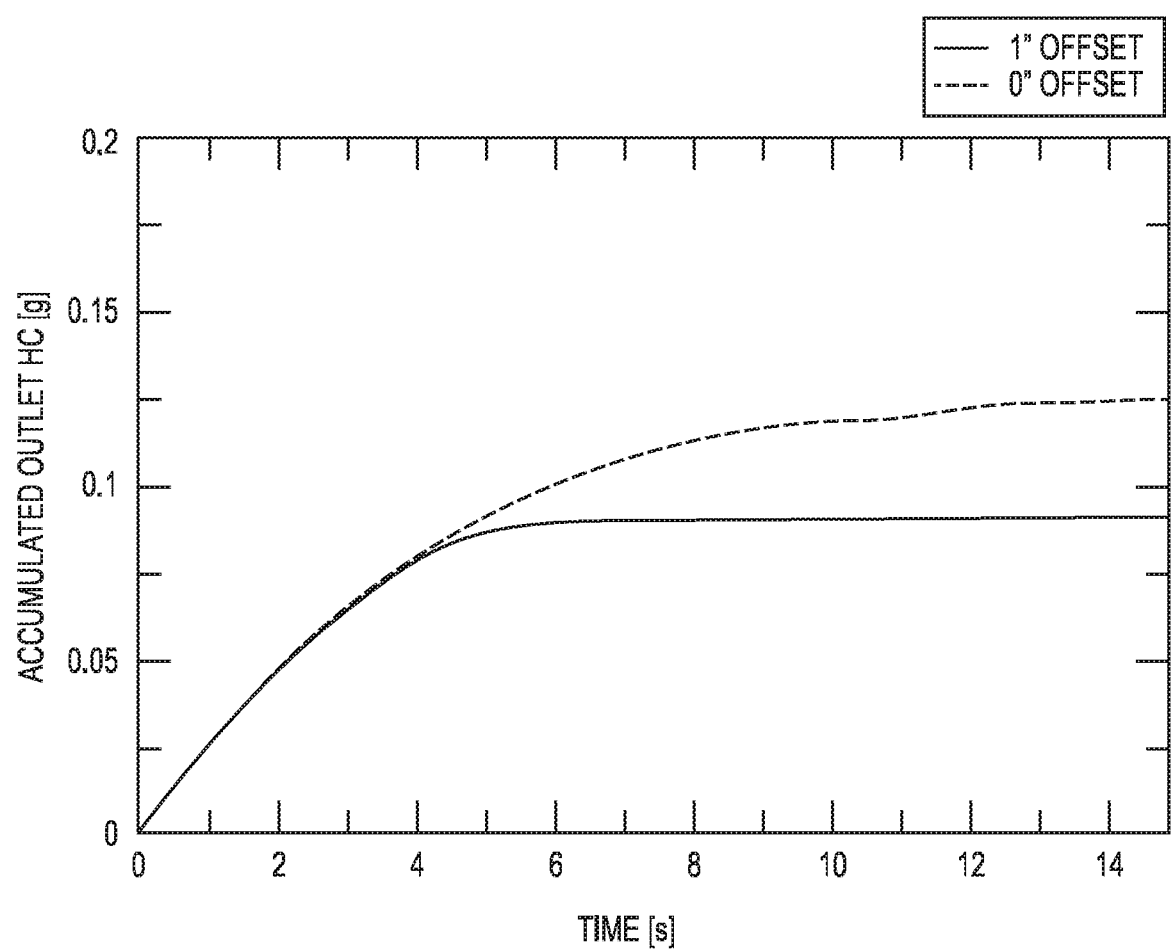
FIG. 12 is a graphical plot of data showing amount of hydrocarbon accumulated at the outlet of a gas particulate filter (GPF) honeycomb body using the plugging configuration of the exemplary embodiment of FIG. 10 compared to hydrocarbon accumulated at the outlet of a gas particulate filter (GPF) honeycomb body using the plugging configuration of the exemplary embodiment of FIG. 11 with the plugs offset from the inlet face by one inch (2.54 cm).

FIG. 12 is a graphical plot of data showing amount of hydrocarbon accumulated at the outlet of a gas particulate filter (GPF) honeycomb body using the plugging configuration of the exemplary embodiment of FIG. 10 compared to hydrocarbon accumulated at the outlet of a gas particulate filter (GPF) honeycomb body using the plugging configuration of the exemplary embodiment of FIG. 11 with the plugs offset from the inlet face by one inch (2.54 cm). These results were obtained using Comsol® for a 30,000 hr-1 space velocity flow rate with 0.05% $C_3H_6$ as the hydrocarbon and 0.5% $O_2$ in the inlet stream. The temperature of the inlet gas was ramped from 25° C. to 600° C. in 17 seconds.

FIGS. 13A-13C show a cross-sectional side view of a method of plugging a honeycomb body with offset layered plugs. FIG. 13A shows a cross-sectional side view of the honeycomb body 10 having a first end face 84 covered by a mask 28, and a first sacrificial layer disposed on a first layer patty 90 disposed on a second layer patty 92 disposed on a second sacrificial layer patty 94 supported on a piston assembly 50 of a plugging machine according to exemplary embodiments of the present disclosure. FIG. 13B shows the first layer patty 90 material on the channel walls within select channels 26 of the honeycomb body 10 and the second layer patty 92 material inward toward an axial center of each respective channel 82 on the first layer according to exemplary embodiments of the present disclosure. Although not wishing to be bound by theory, the first sacrificial layer 89 material deposits on the walls 14 of the respective channels 82. The first layer patty 90 material slides along the first sacrificial layer 89 as piston assembly 50 advances in direction of arrow 60. The first layer patty 90 material deposits on the walls 14 after the first sacrificial layer 89 and the second layer patty 92 material deposits on the first layer patty 90 material urged by a second optional sacrificial layer 94 as piston assembly 50 advances in direction of arrow 60. The layered plug 62 of each respective channel 82 is shown spaced apart from the first end face 84 by the first and second sacrificial layers 89, 94 according to exemplary embodiments of the present disclosure. FIG. 13C shows the layered plug 62 of each respective channel 82 spaced apart from the first end face 84 according to exemplary embodiments of the present disclosure. A heat treatment or chemical treatment can be used to remove the material of the first and optional second sacrificial layers 89, 94. For example, the material of the first and second sacrificial layers 89, 94 can be an organic material. The honeycomb body 10 of FIG. 13C shows a first portion 26 of the channels 22 at the first end face 84 sealed by layered plugs 62 spaced apart from the first end face 84. However, the disclosure is not so limited and can include, for example, a second portion 27 of the channels 22 at the second end face 80 sealed by layered plugs 62 spaced apart from the second end face 80.

Figure 14:
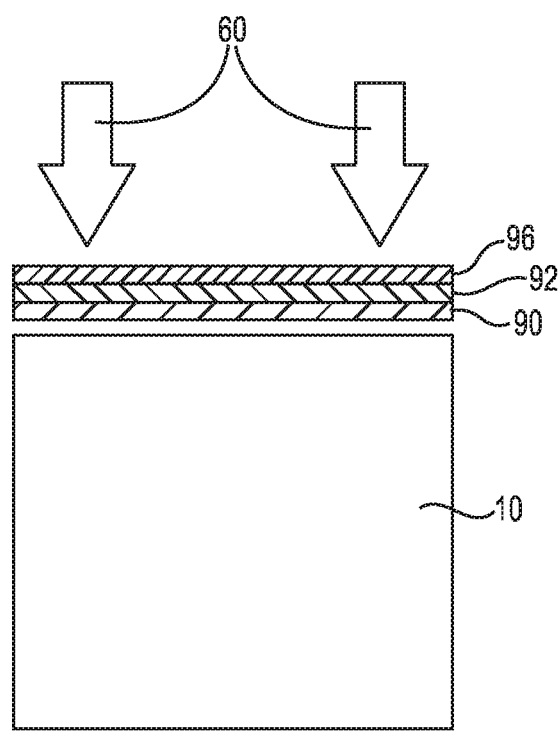
FIG. 14 is a schematic cross-sectional side view showing a honeycomb body, a first layer patty disposed on a second layer patty disposed on a third layer patty to be pushed into select channels of honeycomb body at an end face according to exemplary embodiments of the present disclosure.

FIG. 14 is a schematic cross-sectional side view showing a honeycomb body 10, a first layer patty 90 disposed on a second layer patty 92 disposed on a third layer patty 96 to be pushed into select channels 26 of honeycomb body 10 at an end face 18 according to exemplary embodiments of the present disclosure. The descriptions of the methods and layered plugs of the exemplary embodiments of the disclosure apply to understanding that the second layer 66 can include more than one layer. The more than one layers can be disposed inwardly toward the axial center of the respective channels from the preceding layer as the second layer 66 is disposed inwardly toward the axial center of the respective channels from the first layer 64 in the preceding illustrated embodiments.

Advantages of exemplary embodiments of the disclosure include control over axially and radially varying plug properties, CTE protection, decreased light-off temperature, low mass to high bond strength, increased plug length, plug depth uniformity, and a combination thereof.

It will be apparent to those skilled in the art that various modifications and variations can be made in the disclosed exemplary embodiments without departing from the spirit or scope of the disclosure. Thus, it is intended that the appended claims cover the modifications and variations of this disclosure provided they come within the scope of the appended claims and their equivalents.

What is claimed is:

1. A porous ceramic honeycomb body, comprising:
   intersecting walls that form channels extending axially from a first end face to a second end face; and
   plugs to seal at least one of a first portion of the channels at the first end face and a second portion of the channels at the second end face, the plugs comprising:
      a first layer disposed on the walls of respective channels, and a second layer disposed inward toward a central axis of each respective channel on the first layer, such that the first layer peripherally surrounds the second layer and spaces the second layer away from contact with the intersecting walls,
      wherein the first layer has a tip portion positioned distalmost from the respective end face and extending across each respective channel, the tip portion covering an axial end of the second layer.

2. The porous ceramic honeycomb body of claim 1, wherein the first layer comprises a first composition and the second layer comprises a second composition.

3. The porous ceramic honeycomb body of claim 2, wherein the second composition is different from the first composition.

4. The porous ceramic honeycomb body of claim 3, wherein:
the first composition comprises a first dispersion of silica particles and a first inorganic particle component,
the second composition comprises a second dispersion of silica particles and a second inorganic particle component,
wherein the first inorganic particle component comprises an average particle size less than the second inorganic particle component, and
wherein the first dispersion of silica comprises a first average particle size smaller than a second average particle size of the second dispersion of silica particles.

5. The porous ceramic honeycomb body of claim 4, wherein the first dispersion of silica particles comprises a multimodal particle size distribution.

6. The porous ceramic honeycomb body of claim 2, wherein the first composition comprises a first colloidal silica composition that is gelled and the second composition comprises a second colloidal silica composition that is not gelled.

7. The porous ceramic honeycomb body of claim 2, wherein the first composition comprises a transitory component capable of removal through at least one of thermal treatment and chemical treatment.

8. The porous ceramic honeycomb body of claim 1, wherein at least one of the first layer and the second layer comprises a catalytically active component or a chemically active component of the plug structure.

9. The porous ceramic honeycomb body of claim 8, wherein the catalytically active component is catalytically active in a NOx reducing reaction and the chemically active component is chemically active in hydrocarbon reduction reaction.

10. The porous ceramic honeycomb body of claim 1, wherein the first layer comprises a first property and the second layer comprises a second property different from the first property.

11. The porous ceramic honeycomb body of claim 1, wherein the first layer comprises a first porosity and the second layer comprises a second porosity different from the first porosity.

12. The porous ceramic honeycomb body of claim 1, wherein the first layer comprises a first coefficient of thermal expansion protection (CP1) and the second layer comprises a second coefficient of thermal expansion protection (CP2) different from the first coefficient of thermal expansion protection (CP1),
wherein the walls comprise a coefficient of thermal expansion (CTE3) that increases locally when at least one of the first layer and the second layer is disposed thereon.

13. The porous ceramic honeycomb body of claim 12, wherein CP2<CP1, wherein greater coefficient of thermal expansion protection refers to a smaller increase in the wall CTE3.

14. The porous ceramic honeycomb body of claim 1, wherein the second layer comprises more than one layer, the more than one layers disposed inwardly toward the central axis of the respective channel from the preceding layer.

15. The porous ceramic honeycomb body of claim 1, wherein the plugs are disposed in the respective channels spaced apart from the respective end face.

16. The porous ceramic honeycomb body of claim 1, wherein the first layer and the second layer are exposed at respective axial ends thereof positioned proximalmost to the respective end face.

17. A method of plugging a porous ceramic honeycomb body comprising intersecting walls that form channels extending axially from a first end face to a second end face, the method comprising:
disposing a first layer patty on a second layer patty;
disposing the second layer patty on a support;
pressing the support and the porous ceramic honeycomb body together in an axial direction a predetermined distance to inject the first layer and the second layer in at least one of a first portion of the channels at the first end face and a second portion of the channels at the second end face to form plugs to seal the at least one of the first portion of the channels at the first end face and the second portion of the channels at the second end face, the plugs comprising a first layer of the first layer patty composition disposed on the walls of respective channels, and a second layer of the second layer patty composition disposed inward toward a central axis of each respective channel on the first layer, such that the first layer peripherally surrounds the second layer and spaces the second layer away from contact with the intersecting walls, wherein the first layer has a tip portion positioned distalmost from the respective end face and extending across each respective channel, the tip portion covering an axial end of the second layer.

18. The method of plugging a porous ceramic honeycomb body of claim 17, further comprising disposing a mask on at least one of the first end face and the second end face prior to pressing the support and the porous ceramic honeycomb body together.

19. The method of plugging a porous ceramic honeycomb body of claim 18, further comprising sealing the support and the mask forming a reservoir containing the first layer patty on the second layer patty prior to pressing the support and the porous ceramic honeycomb body together.

20. The method of plugging a porous ceramic honeycomb body of claim 17, further comprising:
retracting the support and the porous ceramic honeycomb body; and
passing a parting member between the support and the at least one of the first end face and the second end face.

21. The method of plugging a porous ceramic honeycomb body of claim 17, wherein
disposing a first layer patty on a second layer patty further comprises forming the second layer patty by disposing at least one additional layer patty on a third layer patty.

22. The method of plugging a porous ceramic honeycomb body of claim 17, wherein the first layer patty comprises a first composition and the second layer patty comprises a second composition.

* * * * *